(12) United States Patent
Han et al.

(10) Patent No.: US 12,112,299 B2
(45) Date of Patent: Oct. 8, 2024

(54) ELECTRONIC APPARATUS AND CONTROL METHOD THEREOF

(71) Applicant: Samsung Electronics Co., Ltd., Suwon-si (KR)

(72) Inventors: Najeong Han, Suwon-si (KR); Keehwan Ka, Suwon-si (KR); Sanga Kim, Suwon-si (KR); Sunhyung Kim, Suwon-si (KR); Yeonghyeok Kim, Suwon-si (KR); Seoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 17/644,544

(22) Filed: Dec. 15, 2021

(65) Prior Publication Data

US 2022/0122040 A1    Apr. 21, 2022

Related U.S. Application Data

(63) Continuation of application No. PCT/KR2021/014095, filed on Oct. 13, 2021.

(30) Foreign Application Priority Data

Oct. 21, 2020    (KR) .................. 10-2020-0136509

(51) Int. Cl.
*G06Q 10/10*    (2023.01)
*G06Q 10/1093*    (2023.01)
*H04L 12/28*    (2006.01)

(52) U.S. Cl.
CPC ..... *G06Q 10/1093* (2013.01); *H04L 12/2823* (2013.01)

(58) Field of Classification Search
CPC ..................................... G06Q 10/10
(Continued)

(56) References Cited

U.S. PATENT DOCUMENTS 10,776,727 B2    9/2020    Jeong et al.
10,803,315 B2    10/2020   Cho et al.
(Continued)

FOREIGN PATENT DOCUMENTS

JP         5033001 B2      9/2012
JP         2017027426 A    2/2017
(Continued)

OTHER PUBLICATIONS

International Search Report and Written Opinion of the International Searching Authority in connection with International Application No. PCT/KR2021/014095 issued Jan. 28, 2022, 16 pages.
(Continued)

*Primary Examiner* — Nga B Nguyen

(57) ABSTRACT

An electronic apparatus is disclosed. The electronic apparatus includes a memory storing a meal schedule including meal information for each time period, a communication interface configured to communicate with a server and a home appliance related to the meal schedule, and a processor configured to, in response to receiving update information related to a user context from the server, change the meal schedule based on time information included in the received update information and time information of the meal schedule, and provide information related to the changed meal schedule to the home appliance.

20 Claims, 18 Drawing Sheets

(58) Field of Classification Search
USPC .......................................................... 705/7.18
See application file for complete search history.

(56) References Cited

U.S. PATENT DOCUMENTS

| | | | |
|---|---|---|---|
| 10,917,753 | B2 | 2/2021 | Chon et al. |
| 2007/0233285 | A1 | 10/2007 | Yamamoto |
| 2013/0224694 | A1* | 8/2013 | Moore ............... G09B 19/0092 434/127 |
| 2014/0242556 | A1 | 8/2014 | Yoo et al. |
| 2015/0279234 | A1* | 10/2015 | Chernenko ........ G09B 19/0092 434/127 |
| 2018/0285463 | A1* | 10/2018 | Choi .................... G06F 16/9535 |
| 2019/0199547 | A1 | 6/2019 | Bazar et al. |
| 2019/0213416 | A1 | 7/2019 | Cho et al. |
| 2019/0281878 | A1* | 9/2019 | Tang ................. G06F 16/90324 |
| 2020/0042865 | A1 | 2/2020 | Lee et al. |
| 2020/0226671 | A1 | 7/2020 | Shin et al. |
| 2020/0258029 | A1 | 8/2020 | Jung et al. |
| 2020/0280821 | A1 | 9/2020 | Chon et al. |

FOREIGN PATENT DOCUMENTS

| | | |
|---|---|---|
| JP | 6106180 B2 | 3/2017 |
| JP | 2019053435 A | 4/2019 |
| KR | 10-0373094 B1 | 2/2003 |
| KR | 10-0660699 B1 | 12/2006 |
| KR | 10-1259130 B1 | 4/2013 |
| KR | 10-1552339 B1 | 9/2015 |
| KR | 20190084567 A | 7/2019 |
| KR | 10-2010296 B1 | 8/2019 |
| KR | 10-2019-0104487 A | 9/2019 |
| KR | 20200098856 A | 8/2020 |
| KR | 10-2020-0105290 A | 9/2020 |

OTHER PUBLICATIONS

Supplementary European Search Report dated Nov. 14, 2023, in connection with European Patent Application No. 21883105.5, 9 pages.

* cited by examiner

FIG. 3A

| USER A | | |
|---|---|---|
| JULY 25 | 12:00 ~ 13:00 | PAST |
| JULY 31 | 18:00 ~ 19:00 | PIZZA |
| ⋮ | ⋮ | ⋮ |

ELECTRONIC APPARATUS AND CONTROL METHOD THEREOF

CROSS-REFERENCE TO RELATED APPLICATIONS

This application is a bypass continuation of International Application No. PCT/KR2021/014095, filed on Oct. 13, 2021, which is based on and claims priority to Korean Patent Application No. 10-2020-0136509, filed on Oct. 21, 2020, in the Korean Intellectual Property Office, the disclosures of which are incorporated by reference herein in their entireties.

BACKGROUND

1. Field

The disclosure relates to an electronic apparatus and a control method thereof. More particularly, the disclosure relates to an electronic apparatus for managing a meal schedule including meal information for each time of a user, and a control method thereof.

2. Description of Related Art

With the development of electronic technologies, various types of devices have been developed and distributed, and devices providing various communication functions are widely used in general homes. Furthermore, electronic products that do not have a conventional communication function are equipped with a communication function, and thus various utilization methods have been developed to improve user convenience.

Particularly, in recent years, a system for providing users with meal information for each time period has also been developed and provided with a service.

However, the current system for providing meal information stores meal information and only provides related information when the time comes, so there is a limit in improving the user convenience.

SUMMARY

According to an embodiment of the disclosure, an electronic apparatus includes a memory storing a meal schedule including meal information for one or more time periods, a communication interface including communication circuitry configured to communicate with a server and a home appliance related to the meal schedule, and a processor configured to, in response to receiving update information related to a user context from the server, change the meal schedule based on time information included in the received update information and time information of the meal schedule, and control the communication interface to provide information related to the changed meal schedule to the home appliance.

According to an embodiment of the disclosure, a control method of an electronic apparatus includes receiving update information related to a user context from a server, changing a meal schedule based on time information included in the received information and time information of a meal schedule including meal information for each time period, and providing information related to the changed meal schedule to a home appliance related to the meal schedule.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B are views illustrating a method of setting and changing a meal schedule according to an embodiment of the disclosure;

DETAILED DESCRIPTION

Figure 1:
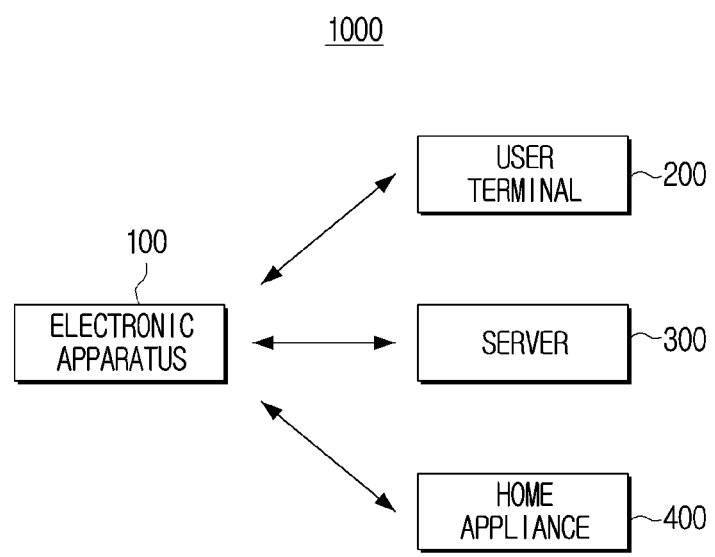
FIG. 1 is a view illustrating an electronic system according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, the disclosure will be described in detail with reference to the accompanying drawings.

An object of the disclosure is to provide an electronic apparatus for identifying the need to change a user meal schedule including meal information for each time period and providing relevant information to the user, and a control method thereof.

Another object of the disclosure is to provide an electronic apparatus for integrally managing a meal schedule for a plurality of users, and a method for controlling the same.

Terms used in the present disclosure are selected as general terminologies currently widely used in consideration of the configuration and functions of the present disclosure, but can be different depending on intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

The expression such as "has," "may have," "includes," or "may include" indicate that there are features (e.g., numbers, functions, operations, or components such as a part), and does not exclude the presence of additional features.

The expression "at least one of A and/or B" indicates either "A" or "B" or "A and B".

The expression "1", "2", "first", or "second" as used herein may modify a variety of elements, irrespective of order and/or importance thereof, and only to distinguish one element from another. Accordingly, without limiting the corresponding elements.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

Also, the term "user" may refer to a person who uses an electronic apparatus or an apparatus (e.g., an artificial intelligence (AI) electronic apparatus) that uses the electronic apparatus.

Hereinafter, exemplary embodiments will be described in greater detail with reference to the accompanying drawings.

FIG. 1 is a view illustrating an electronic system 1000 according to an embodiment of the disclosure. As shown in FIG. 1, the electronic system 1000 includes an electronic apparatus 100, a user terminal 200, a server 300, and a home appliance 400.

The electronic apparatus 100 may acquire a meal schedule including the user meal information for each time period based on information input from the user terminal 200, and when a specific time arrives, the electronic apparatus 100 may provide the meal information corresponding to the specific time to the user terminal 200.

In other words, the electronic apparatus 100 is an apparatus for managing a user meal schedule, and may be implemented as a management server, a computer, or the like. However, the disclosure is not limited thereto, and the electronic apparatus 100 may be implemented as a device owned by the user, such as a desktop PC, a laptop computer, a TV, a smart phone, a tablet PC, a wearable device, or the like, and may manage the user meal schedule. Any device may be used as long as it can manage the user meal schedule.

The electronic apparatus 100 may change the user meal schedule based on update information related to the user context received from the server 300. For example, when it is identified that dinner is impossible because the user is outside, the electronic apparatus 100 may change the user meal schedule and provide information related to the changed meal schedule to the user terminal 200.

The electronic apparatus 100 may control the home appliance 400 based on the user meal schedule. For example, the electronic apparatus 100 may preheat an oven when a specific time comes based on the user meal schedule.

The user terminal 200 is an apparatus that receives a user input, transmits it to the electronic apparatus 100, and provides information related to the meal information received from the electronic apparatus 100 to the user, and may be implemented as a smartphone, a tablet PC, a wearable device, a desktop PC, a laptop computer, a TV, or the like.

However, the disclosure is not limited thereto, and the user terminal 200 may be any device as long as it can receive a user input and provide information to the user.

The server 300 may be a device that acquires the context information of the user and provide the acquired context information to the electronic apparatus 100. For example, the server 300 may be a schedule information server that acquires the user schedule information. Alternatively, the server 300 may be a location information server that acquires the user location information. Alternatively, the server 300 may be a sensor information server that acquires sensor information in the user meal location. Alternatively, the server 300 may be a payment information server that acquires the user payment information.

The above server 300 may be implemented individually or may be implemented as a single integrated server.

The home appliance 400 may be disposed in the user meal location, and may be a device that assists the user meal. For example, the home appliance 400 may be a device used for the user meal, such as an oven, or a device for storing ingredients, such as a refrigerator. However, the disclosure is not limited thereto, and the home appliance 400 has a display and may display the user meal information, and any device may be used as long as it is a device for assisting the user in eating.

Figure 2A:
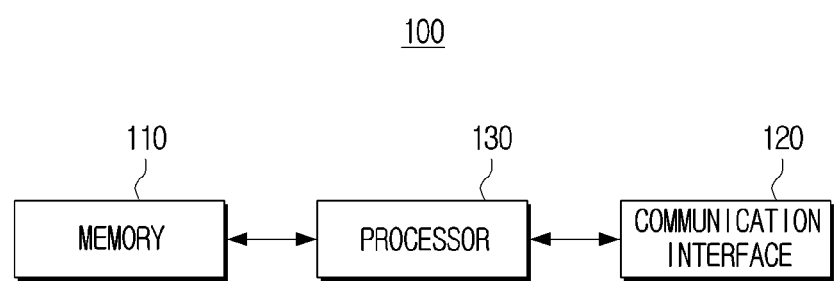
FIG. 2A is a block view illustrating a configuration of an electronic apparatus according to an embodiment of the disclosure.

FIG. 2A is a block view illustrating a configuration of an electronic apparatus 100 according to an embodiment of the disclosure. The electronic apparatus 100 includes a memory 110, a communication interface 120, and a processor 130 as shown in FIG. 2A.

The memory 110 may refer to hardware that stores information such as data in an electrical or magnetic form such that it can be accessed by the processor 130. For this operation, the memory 110 may be implemented with at least one hardware selected from non-volatile memory, volatile memory, flash memory, hard disk drive (HDD) or solid state drive (SSD), RAM, ROM, or the like.

At least one instruction or module required for the operation of the electronic apparatus 100 or the processor 130 may be stored in the memory 110. Here, the instruction is a unit of code for instructing the operation of the electronic apparatus 100 or the processor 130 and may be written in machine language, which is a language that a computer can understand. The module may be a set of instructions that perform a specific task of a unit of work.

The memory 110 may store data that is information in units of bits or bytes that can indicate characters, numbers, images, or the like. For example, the memory 110 may store a meal schedule including meal information for each time period of the user.

The memory 110 may store information for determining a change condition of a meal schedule, a change method, whether a user can eat, or the like.

The memory 110 may be accessed by the processor 130, and perform readout, recording, correction, deletion, update, and the like, on data by the processor 130.

The communication interface 120 is provided to perform communication with various types of external devices according to various types of communication methods. For example, the electronic apparatus 100 may communicate with the user terminal 200, the server 300, and the home appliance 400 through the communication interface 120.

The communication interface 120 may include a Wi-Fi module, a Bluetooth module, an infrared communication module, and a wireless communication module. Here, each communication module may be implemented in the form of at least one hardware chip.

The Wi-Fi module and Bluetooth module each performs communication in the Wi-Fi method, and Bluetooth method, respectively. If the Wi-Fi module or the Bluetooth module is used, various kinds of connection information such as a subsystem identification (SSID), a session key and the like is transmitted and received first, and after establishing communication, various kinds of information may be transmitted and received. The infrared communication module communicates according to the infrared data association (IrDA) technology, which wirelessly transmits data in a short distance using infrared that is between visible light and millimeter waves.

In addition to the communication method described above, the wireless communication module may include at least one communication chip that performs communication according to various wireless communication standards, such as Zigbee, 3rd Generation (3G), 3rd Generation Partnership Project (3GPP), Long Term Evolution (LTE), LTE Advanced (LTE-A), 4th Generation (4G), 5th Generation (5G), or the like.

Alternatively, the communication interface 120 may include a wired communication interface such as HDMI, DP, Thunderbolt, USB, RGB, D-SUB, DVI, or the like.

In addition, the communication interface 120 may include at least one of a local area network (LAN) module, an Ethernet module, or a wired communication module for performing communication using a pair cable, a coaxial cable, or an optical fiber cable.

The processor 130 controls the overall operation of the electronic apparatus 100. Specifically, the processor 130 may be connected to each component of the electronic apparatus 100 to control the overall operation of the electronic apparatus 100. For example, the processor 130 may be connected to components such as the memory 110 and the communication interface 120 to control the operation of the electronic apparatus 100.

According to an embodiment, the processor 130 may be implemented as a digital signal processor (DSP), a microprocessor, or a time controller (TCON). However, the disclosure is not limited thereto, and may include one or more of central processing unit (CPU), micro controller unit (MPU), micro processing unit (MPU), controller, application processor (AP), or communication processor (CP), ARM pressor, or may be defined as the corresponding term. In addition, the processor 130 may be implemented as a System on Chip (SoC) or large-scale integration (LSI) in which a processing algorithm is embedded, or a Field programmable gate array (FPGA).

When update information related to the user context is received from the server through the communication interface 120, the processor 130 may change the meal schedule based on time information included in the received information and time information of the meal schedule, and control the communication interface 120 to provide information related to the changed meal schedule to the related home appliance 400.

Specifically, the processor 130 may identify whether a meal according to the meal schedule is possible in a time period corresponding to the time information included in the received information based on the time information included in the received information and the time information of the meal schedule, and if meals are identified as impossible, the meal schedule may be changed.

For example, when location information indicating that the user is located in a company at 7 pm is received, the processor 130 may identify that a meal at 7 pm is impossible based on the 7 pm meal information included in the meal schedule, and may change the 7 pm meal information.

Meanwhile, the updated information related to the user context may include the updated user schedule information, and the processor 130 may identify whether a meal according to the meal schedule is possible in a time period corresponding to the updated schedule information, and may change the meal schedule if it is identified that the meal is impossible based on the updated user schedule information and time information of the meal schedule.

Alternatively, the updated information related to the user context may include the updated user location information, and the processor 130 may identify whether a meal according to the meal schedule is possible based on the updated user location information, and may change the meal schedule if it is identified that the meal is not possible.

Here, the processor 130 may identify whether the user can reach a meal location corresponding to the meal schedule in a time period included in the meal schedule based on the updated location information, and change the meal schedule when it is identified that the meal location is unreachable.

For example, when the user current location is two hours away from the user meal location and one hour remains until the meal time according to the meal schedule, the processor 130 may change the meal schedule.

When at least one of sensing information sensed at a meal location corresponding to a meal schedule or user payment history information is received, the processor 130 may identify the user location information based on the received information.

For example, when information sensed by the user is received from at least one sensor disposed at a meal location corresponding to the meal schedule, the processor 130 may identify that the user is in the meal location. Alternatively, the processor 130 may receive payment information from a server of a corresponding card company when the user purchases goods using a card from the outside, and may identify the user location information based on the received payment information.

Meanwhile, in the description above, the processor 130 changes the meal schedule, but the disclosure is not limited thereto. For example, when it is identified that a change in the meal schedule is necessary based on time information included in the received information and time information of the meal schedule, the processor 130 may control the communication interface 120 to transmit a request for changing the meal schedule to the user terminal 200, and change the meal schedule based on the received information when information corresponding to the change request is received from the user terminal 200.

In other words, the processor 130 may notify the user of the need to change the meal schedule, and may change the meal schedule by receiving the user input.

Here, the processor 130 may simply notify the user that a change in the meal schedule is necessary, or may provide a recommended meal schedule at the same time notifying the user that the change in the meal schedule is necessary. For example, the processor 130 may notify the user of the need to change the meal schedule and recommend a time period of the meal information to be changed as a different time period.

Meanwhile, if it identified that the user meal is necessary based on the received information in a state in which the meal information corresponding to the time information included in the received information is not included in the meal schedule, the processor may control the communication interface 120 to transmit the recommended meal information corresponding to the time information to the user terminal 200.

For example, when update information indicating that the user has been detected in the user home is received in a state where there is no dinner schedule according to the user external schedule, the processor 130 may provide meal information to the user terminal 200.

In addition, the processor 130 may control the communication interface 120 to transmit a control signal for controlling the operation of the home appliance 400 related to the meal schedule to the home appliance 400 based on the changed meal schedule.

For example, when the user meal is canceled according to the update information related to the user context, the processor 130 may stop a preheating of a preheating oven. Alternatively, when the user meal schedule is generated according to the update information related to the user context, the processor 130 may preheat the oven and control the home appliance 400 provided with the display to display the meal information.

Meanwhile, when a plurality of update information related to the user context are received through the communication interface 120, the processor 130 may identify at least update information based on a priority of the plurality of update information, and change the meal schedule based on the identified update information and time information of the meal schedule.

The plurality of update information may be update information for the same user. For example, the processor 130 may receive updated schedule information and updated location information of the user from the user. In this case, the processor 130 may change the meal schedule based on information having a higher priority among the two information.

Alternatively, the plurality of update information may be update information for each of a plurality of users. For example, the memory 110 may store meal schedule information for not only the user but also the user family. In this case, the processor 130 may receive information about each family member. In addition, the processor 130 may generate a meal schedule based on a food list including a meal time of each family member or food in the refrigerator. For example, if a first member of the family has the earliest meal time, the processor 130 may generate a first meal based on at least one of health information, meal preference, or holding food ingredients of the first member, and store information on the type and amount of the food ingredient to be used. In addition, the processor 130 may proceed to purchase insufficient ingredients or provide information about the insufficient ingredients to family members based on the type and amount of ingredients to be used in the first meal.

In addition, when a meal of a second member is scheduled after the meal of the first member, the processor 130 may generate a second meal based on the remaining ingredients except for the type and amount of the ingredients to be used in the first meal from the food list, and store information on the type and amount of food ingredients. In addition, the processor 130 may proceed to purchase insufficient ingredients or provide information on the insufficient ingredients to family members based on the type and amount of ingredients to be used in the second meal.

When the schedule of the first member or the second member is changed, the processor 130 may change the meal schedule by reflecting the change. For example, when the meal time of the first member is delayed, the processor 130 may identify whether the meal time with the second member overlaps. When the meal times overlap, the processor 130 may provide the first meal and the second meal in an integrated manner. Here, the processor 130 may identify a food that the second member should not eat in the first meal and a food that the first member should not eat in the second meal, and provide a corrected meal changed to food that can replace it.

Figure 2B:
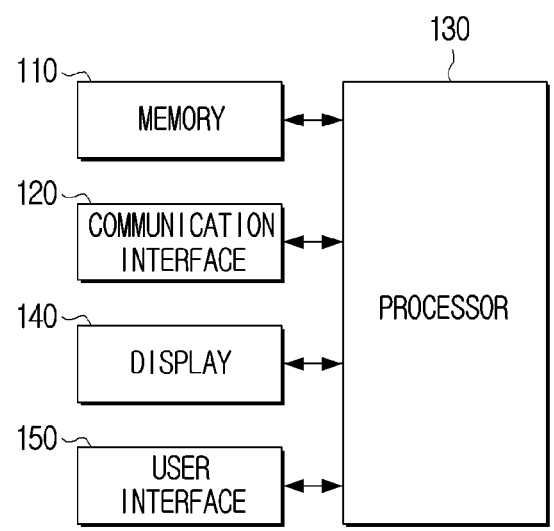
FIG. 2B is a block view illustrating an example of a detailed configuration of an electronic apparatus.

FIG. 2B is a block view illustrating an example of a detailed configuration of the electronic apparatus 100. The electronic apparatus 100 may include a memory 110, a communication interface 120, and a processor 130. Also, according to FIG. 2B, the electronic apparatus 100 may further include a display 140 and a user interface 150. Among the components shown in FIG. 2B, detailed descriptions overlapping with components shown in FIG. 2A will be omitted.

The electronic apparatus 100 may be implemented as an external server, or may be implemented as a device owned by the user and disposed inside the user house. In this case, the electronic apparatus 100 may include the display 140 and the user interface 150 to directly provide meal information to the user and receive a user command.

The display 140 may be implemented as various types of displays, such as an LCD (Liquid Crystal Display), an OLED (Organic Light Emitting Diodes) display, and a PDP (Plasma Display Panel). The display 140 may include a driving circuit, a backlight unit, and the like which may be implemented in forms such as an a-si TFT, a low temperature poly silicon (LTPS) TFT, an organic TFT (OTFT), and the like. The display 140 may be realized as a Plasma Display Panel (PDP), a Liquid Crystal Display (LCD), an Organic Light Emitting Diode (OLED), a flexible display, a 3-dimensional (3D) display, or the like.

The user interface 150 may be implemented to be device such as button, touch pad, mouse and keyboard, or may be implemented to be touch screen that can also perform the function of the display described above. The button may include various types of buttons, such as a mechanical button, a touch pad, a wheel, etc., which are formed on the front, side, or rear of the exterior of a main body.

As described above, the electronic apparatus 100 may change the meal schedule based on update information related to the user context, and may provide information related to the changed meal schedule.

Hereinafter, the operation of the electronic apparatus 100 will be described in more detail with reference to the drawings.

Figure 3B:
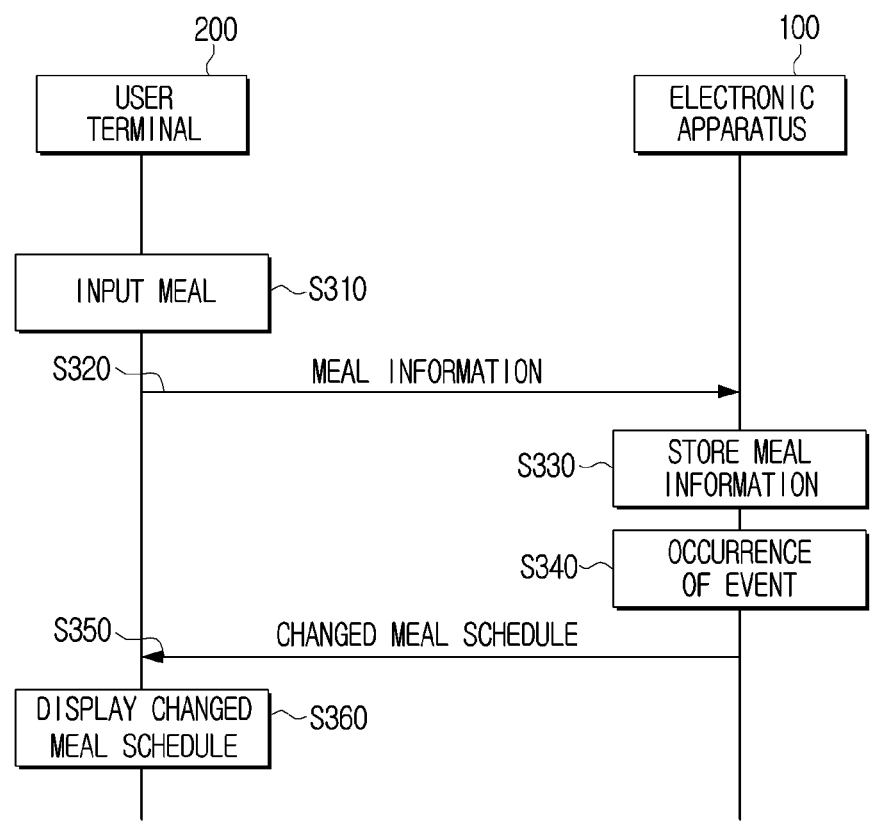

FIGS. 3A and 3B are views illustrating a method of setting and changing a meal schedule according to an embodiment of the disclosure.

The memory 110 may store a meal schedule including user, time, and meal information. For example, as shown in FIG. 3A, user A's meal information of July 25, 12:00~13:00 and July 31, 18:00~19:00 may be stored in the memory 110.

However, the disclosure is not limited thereto, and specific ingredients and cooking methods may be further stored in the memory 110. In addition, the memory 110 may further store another user meal schedule.

The electronic apparatus 100 may acquire a meal schedule in the same way as in FIG. 3B. The user terminal 200 may receive time and meal input from the user (S310). The user terminal 200 may transmit meal information to the electronic apparatus 100 (S320). In this case, the user terminal 200 may transmit user information corresponding to the meal information to the electronic apparatus 100.

The electronic apparatus 100 may store the meal information (S330), and when an event occurs (S340), the electronic apparatus 100 may change the meal schedule and transmit it to the user terminal 200 (S350).

The user terminal 200 may display the changed meal schedule (S360).

Although it has been described that the user inputs specific meal information in FIG. 3B, the disclosure is not limited thereto. For example, the user terminal may provide the user with various meal information, and a user meal schedule may be generated in such a way that the user selects desired meal information.

Figure 4:
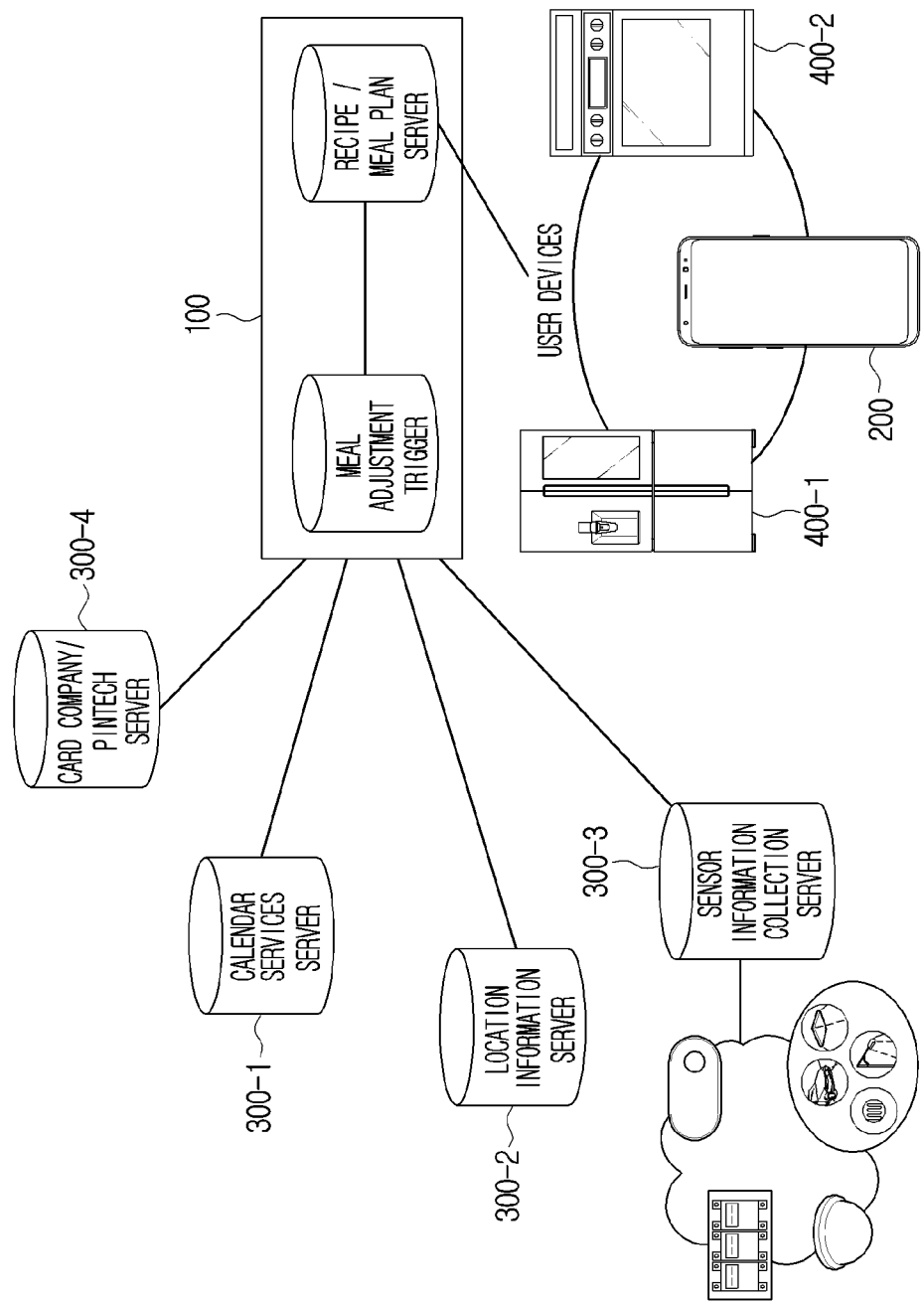
FIG. 4 is a view illustrating an occurrence of an event according to an embodiment of the disclosure.

FIG. 4 is a view illustrating an occurrence of an event according to an embodiment of the disclosure.

In order to explain an operation of the electronic apparatus 100 in more detail, FIG. 4 illustrates that the electronic apparatus 100 is implemented as a meal adjustment trigger server and a recipe/meal plan server. The meal adjustment trigger server is a device for identifying a situation in which the user cannot or will eat unexpectedly, and the meal schedule server is a device in which a meal schedule is stored.

However, the disclosure is not limited thereto, and the electronic apparatus 100 may be implemented in various forms.

A calendar services server 300-1 is a server for storing the user schedule, and may be linked with the user terminal 200 to manage the user schedule. For example, when the user inputs the user schedule through the user terminal 200, the user terminal 200 may transmit the inputted user schedule to the schedule server 300-1, and the schedule server 300-1 may update the user schedule based on the received information. When the user schedule is input, the schedule server 300-1 may transmit the inputted schedule to the electronic apparatus 100.

A location information server 300-2 is a server that stores the user location information, and may store the user location information received from the user terminal 200, for example. The location information server 300-2 may transmit the user location information to the electronic apparatus 100 at predetermined time intervals.

A sensor information collection server 300-3 may store information received from sensors disposed at the user meal location. For example, the sensor information collection server 300-3 may receive and store information on whether the user is detected from sensors disposed in the user home, office, or car. The sensor information collection server 300-3 may transmit information on whether the user is detected to the electronic apparatus 100 at predetermined time intervals.

A card company server 300-4 may store card payment information of the user. Here, since the card payment information includes information on a store where the payment is made, it may be used to identify the location of the user. The card company server 300-4 may transmit card payment information of the user to the electronic apparatus 100 when a card payment is made.

The electronic apparatus 100 may directly or indirectly identify the location of the user based on the information received from each of the servers 300-1 to 300-4. For example, when the location information of the user is received from the location information server 300-2, the electronic apparatus 100 may identify the location of the user by itself. Alternatively, when the user schedule is received from the schedule server 300-1, the electronic apparatus 100 may identify the user location at a time included in the received schedule information.

When it is identified that it is impossible to eat on the meal schedule based on the user location, the electronic apparatus 100 may change the meal schedule and transmit the changed meal schedule information to the user terminal 200. Also, the electronic apparatus 100 may control home appliances 400-1 and 400-2 based on the changed meal schedule information.

Figure 5:
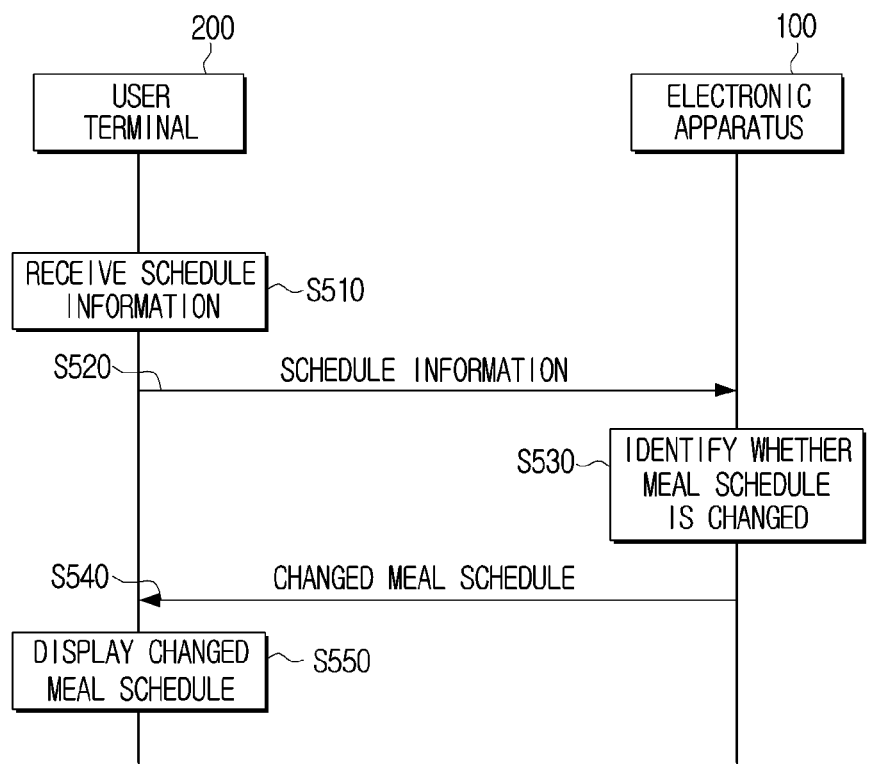
FIG. 5 is a sequence view illustrating a change in a meal schedule according to schedule information according to an embodiment of the disclosure.

FIG. 5 is a sequence view illustrating a change in a meal schedule according to schedule information according to an embodiment of the disclosure.

The user terminal 200 may receive schedule information from the server 300 (S510), and transmit the received schedule information to the electronic apparatus 100 (S520).

The electronic apparatus 100 may identify whether to change the meal schedule based on the schedule information (S530). For example, if the schedule information is a soccer meeting in between 17:00 and 19:00, the electronic apparatus 100 may identify that the meal scheduled for 18:00 is impossible. Alternatively, if the schedule information is to use an outside restaurant, the electronic apparatus 100 may identify that the meal scheduled at 18:00 is impossible. If it is identified that the scheduled meal is impossible based on the schedule information, the electronic apparatus 100 may cancel the scheduled meal at the corresponding time and reorganize a subsequent meal schedule.

When reorganizing the meal schedule, the electronic apparatus 100 may reorganize the meal mainly for ingredients requiring rapid consumption based on a type and an expiration date of the ingredients stored in a user food list. Alternatively, the electronic apparatus 100 may change a scheduled purchase date of a food ingredient since consumption of the food ingredient is delayed according to a cancellation of the meal. The electronic apparatus 100 may transmit information on the changed purchase date to the user terminal 200, and the user terminal 200 may display information on the changed purchase date.

Meanwhile, the electronic apparatus 100 may identify whether or not to change the meal schedule by further considering the type of the schedule. As the example described above, if the schedule information is a soccer meeting in between 17:00 and 19:00, the electronic apparatus 100 may identify that the meal scheduled for 18:00 is impossible. Alternatively, if the schedule information is a family gathering between 17:00 and 19:00, the electronic apparatus 100 may transmit a message inquiring whether a meal scheduled for 18:00 is possible to the user terminal 200. Here, if the schedule information includes the location information of the family gathering and the location information of the family gathering is the same as the meal location of the user, the electronic apparatus 100 may not change the meal schedule without transmitting the inquiry message.

The electronic apparatus 100 may change the meal schedule based on the user input, schedule information, or the user health condition. For example, the user terminal 200 may receive a meal schedule input from the user and transmit the inputted meal schedule to the electronic apparatus 100. The electronic apparatus 100 may change the meal schedule based on the received information.

Alternatively, the user terminal 200 may receive a type of dish eaten at an outside restaurant from the user and transmit the type of dish to the electronic apparatus 100. The electronic apparatus 100 may change the meal schedule based on the type of dish. Alternatively, the electronic apparatus 100 may identify an outside restaurant based on the schedule information, estimate the type of dish eaten by the user based on the information on the outside restaurant, and change the meal schedule based on the type of dish. In this case, the electronic apparatus 100 may change the meal schedule based on at least one of a method of supplementing the user lack of nutrients or a method of helping digestion.

Alternatively, the user terminal 200 may receive the user health condition (e.g., indigestion, fullness, etc.) from the user or acquires the user biometric information, and acquire the user health condition information or transmit the user biometric information to the electronic apparatus 100. The electronic apparatus 100 may change the meal schedule based on the user health condition information or the user biometric information.

When the meal schedule is changed, the electronic apparatus 100 may transmit the changed meal schedule to the user terminal 200 (S540), and the user terminal 200 may display the changed meal schedule (S550).

Figure 6:
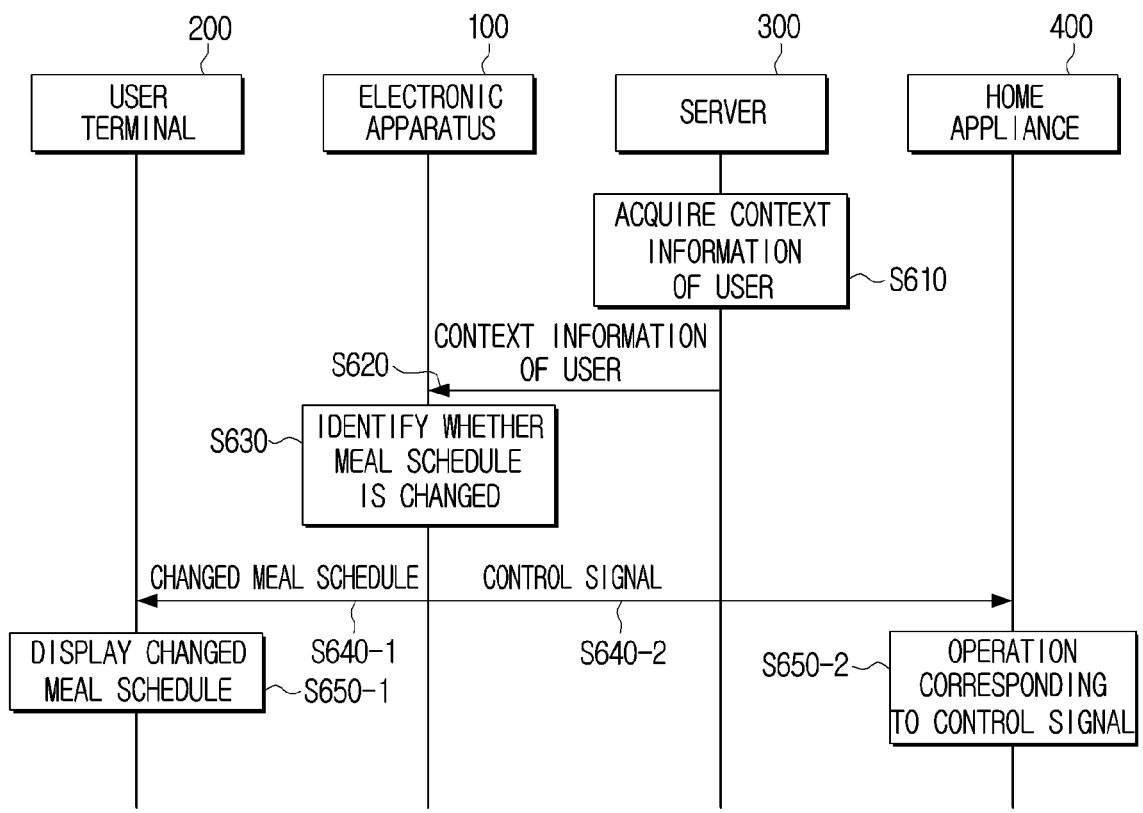
FIG. 6 is a sequence view illustrating a change in a meal schedule according to context information according to an embodiment of the disclosure.

FIG. 6 is a sequence view illustrating a change in a meal schedule according to context information according to an embodiment of the disclosure.

The server 300 may acquire the user context information (S610). Here, the context information may include at least one of location information of the user, information detected by a sensor, and payment information.

The server 300 may transmit the user context information to the electronic apparatus 100 (S620), and the electronic apparatus 100 may identify whether a meal schedule has been changed (S630).

When the meal schedule is changed, the electronic apparatus 100 may transmit the changed meal schedule to the user terminal 200 (S640-1). Also, the electronic apparatus 100 may transmit a control signal for controlling the home appliance 400 to the home appliance 400 (S640-2).

The user terminal 200 may display the changed meal schedule (S650-1), and the home appliance 400 may perform an operation corresponding to a control signal (S650-2).

Figure 7A:
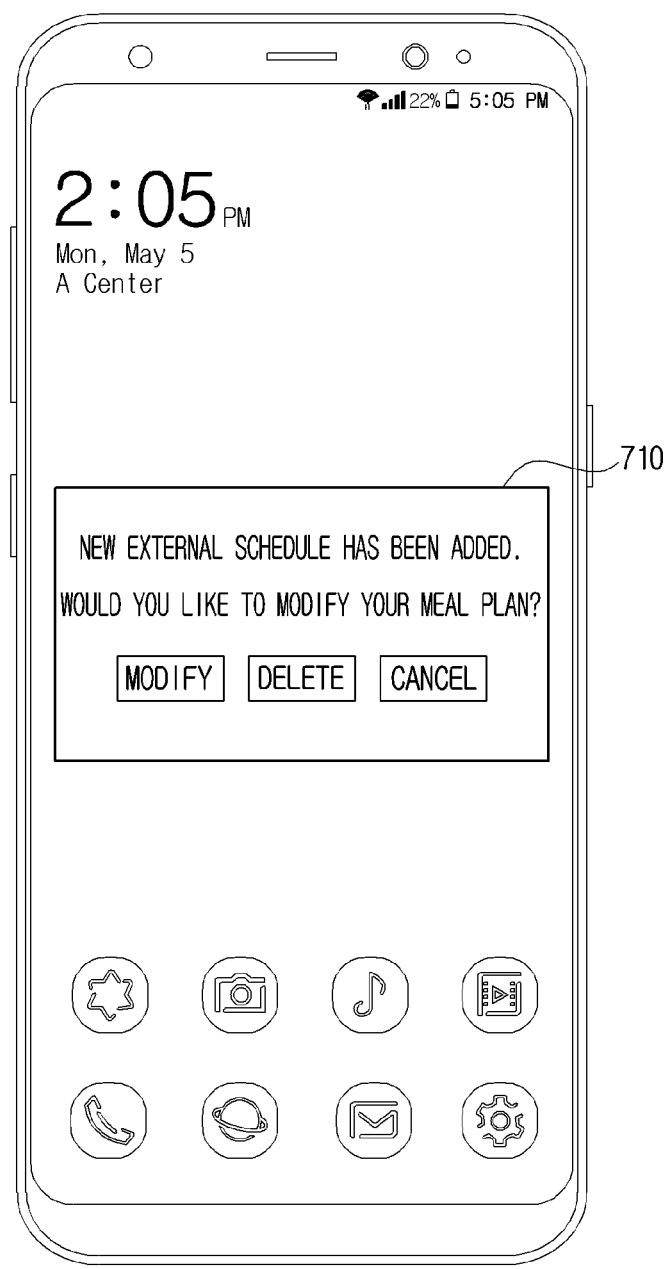
FIGS. 7A and 7B are views illustrating a notification of a change in a meal schedule according to an embodiment of the disclosure.
Figure 7B:
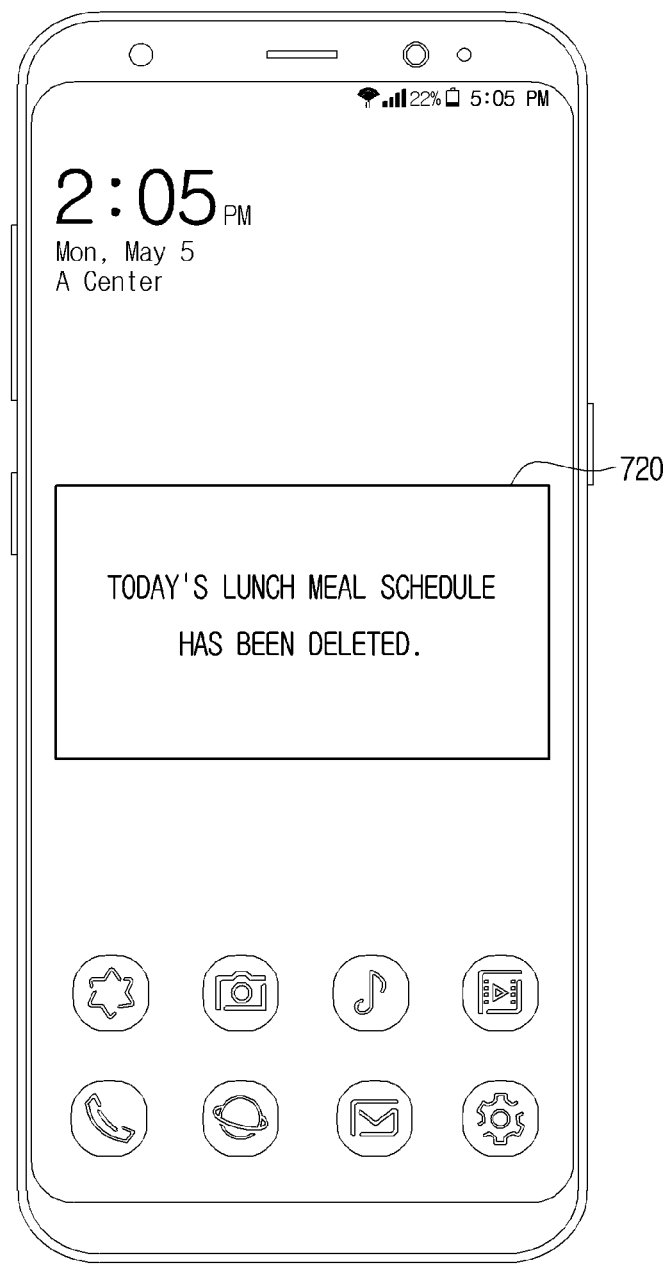

FIGS. 7A and 7B are views illustrating a notification of a change in a meal schedule according to an embodiment of the disclosure.

When it is identified that the meal schedule needs to be changed, the electronic apparatus 100 may request the user terminal 200 to change the meal schedule.

When the request for changing the meal schedule is received, the user terminal 200 may display a message 710 such as "A new external schedule has been added. Would you like to revise the meal plan?" as shown in FIG. 7A, and the user may user input to the electronic apparatus 100.

The electronic apparatus 100 may change the meal schedule based on the user input.

However, the disclosure is not limited thereto, and when it is identified that the meal schedule needs to be changed, the electronic apparatus 100 may request a change of the meal schedule and transmit recommended meal information to the user terminal 200.

In this case, the user terminal 200 may display recommended meal information together with a message 720 such as "A new external schedule has been added. Recommended meal information is as follows."

Alternatively, when it is identified that the meal schedule needs to be changed, the electronic apparatus 100 may directly change the meal schedule. In addition, the electronic apparatus 100 may transmit the changed meal schedule to the user terminal 200, and the user terminal 200 may display a message about the changed meal schedule as shown in FIG. 7B.

When it is identified that the meal schedule needs to be changed, the electronic apparatus 100 may directly change the meal schedule based on the user context or request the user terminal 200 to change the meal schedule.

For example, when it is identified that the user does not reach a predetermined meal location due to a change in the user schedule, the electronic apparatus 100 may directly change the meal schedule as shown in FIG. 7B. Alternatively, when payment information for purchasing a food ingredient is received, the electronic apparatus 100 may transmit a message inquiring whether to change the meal information to the user terminal 200 without directly changing the meal schedule.

Figure 8:
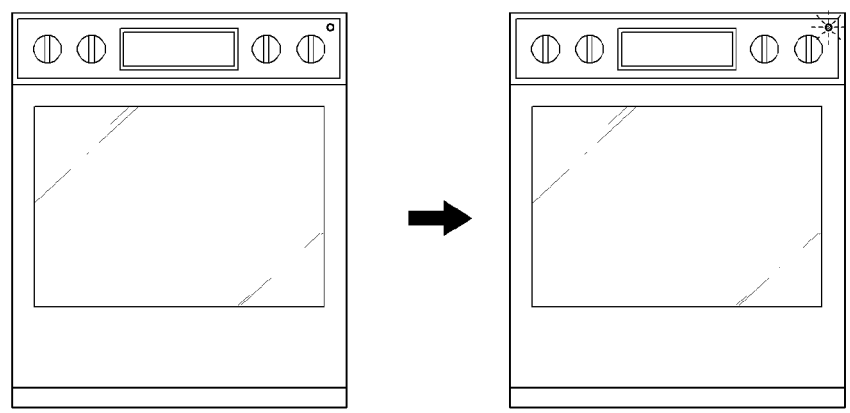
FIG. 8 is a view illustrating a control of an electronic apparatus of home appliance according to an embodiment of the disclosure.

FIG. 8 is a view illustrating a control of the home appliance 400 of the electronic apparatus 100 according to an embodiment of the disclosure.

The electronic apparatus 100 may control the home appliance 400 based on a meal schedule. For example, as shown in FIG. 8, the electronic apparatus 100 may preheat an oven at 17:30 based on the meal schedule of 18:00 to 19:00.

However, the disclosure is not limited thereto, and the electronic apparatus 100 may control any home appliance if it is the home appliance 400 related to a meal schedule. In addition, the electronic apparatus 100 may control the home appliance 400 in different ways according to a type of the home appliance 400.

Figure 9A:
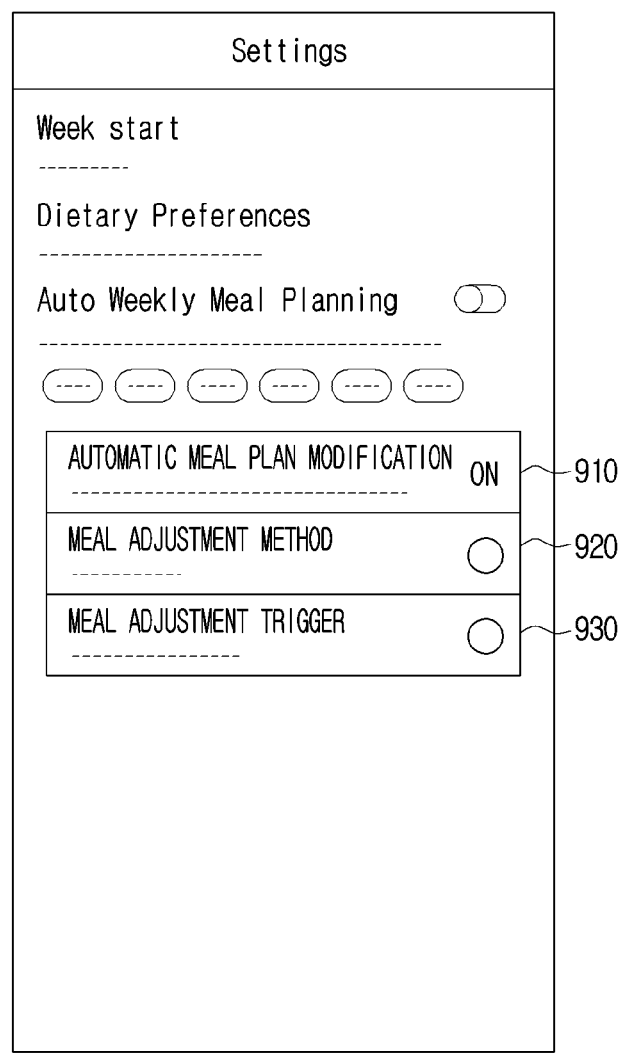
FIGS. 9A to 9C are views illustrating a UI screen for adjusting a meal according to an embodiment of the disclosure.
Figure 9B:
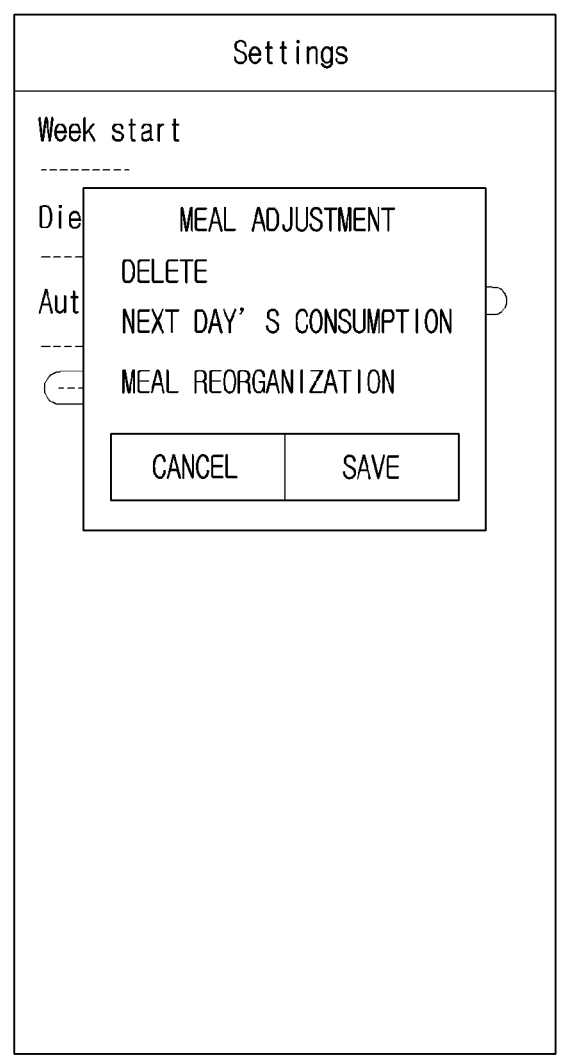
Figure 9C:
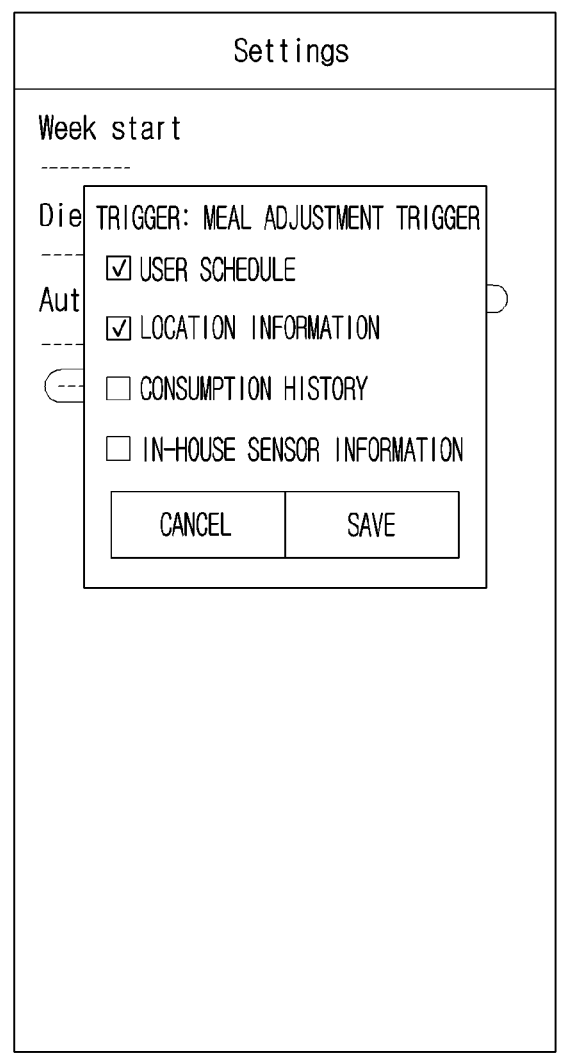

FIGS. 9A to 9C are views illustrating a UI screen for adjusting a meal according to an embodiment of the disclosure.

The user terminal 200 may display a main screen for setting and adjusting a meal schedule, as shown in FIG. 9A. The main screen may include a first meal 910 for setting whether or not to automatically revise a meal plan, a second meal 920 for a method for adjusting a menu, a third meal 930 for a meal adjustment trigger, and other information.

When a first meal 910 is turned on, the electronic apparatus 100 automatically may change the meal schedule, and when the first meal 910 is turned off, the electronic apparatus 100 may request the user terminal 200 to change the meal schedule.

A second meal 920 may provide a menu for adjusting a meal, as shown in FIG. 9B.

As shown in FIG. 9C, a third meal 930 may include a menu for setting a condition for adjusting a meal schedule.

FIGS. 9A to 9C are merely exemplary, and a UI screen may be implemented in any number of ways. Also, categories included in menus of FIGS. 9A to 9C may be variously changed.

Figure 10:
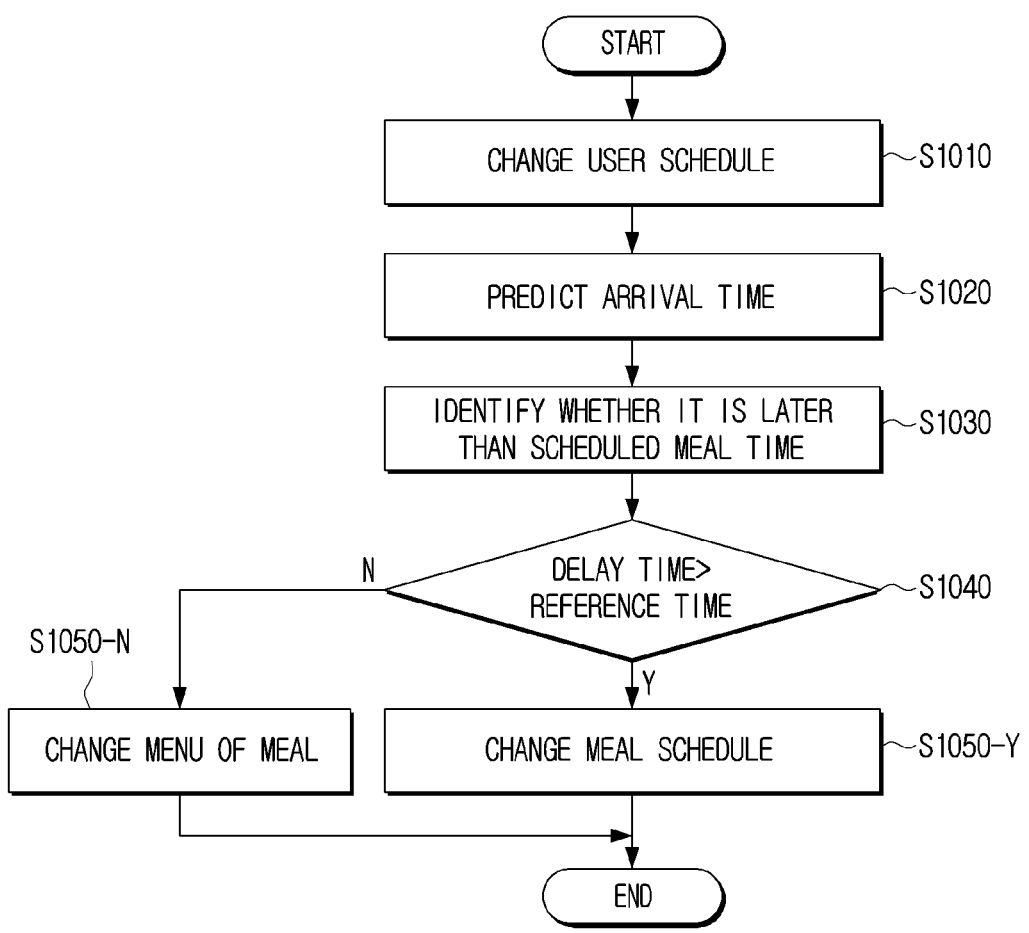
FIG. 10 is a flowchart illustrating an operation according to a schedule change according to an embodiment of the disclosure.

FIG. 10 is a flowchart illustrating an operation according to a schedule change according to an embodiment of the disclosure.

The processor 130 may identify whether the user schedule has changed (S1010). For example, the processor 130 may receive update information related to the user context from the server. The update information may include at least one of schedule information, location information, information sensed by the user, and payment history information of the user.

The processor 130 may predict an arrival time based on the user changed schedule (S1020). For example, when new schedule information of the user of a bookstore visit from 6:00 pm to 7:00 pm is received, the processor 130 may predict the arrival time based on a travel time from the bookstore to a scheduled meal location.

The processor 130 may identify whether it is later than the scheduled meal time based on a predicted arrival time (S1030), and compare a delay time with a reference time (S1040). Here, the reference time is a predetermined value and may be a reference for determining whether to change the meal schedule itself or only a menu of the meal.

When the delay time exceeds the reference time, the processor 130 may change the meal schedule (S1050-Y). For example, if the delay time is 1 hour and the reference time is 30 minutes, the processor 130 may change the meal schedule itself based on the delay time. For example, the processor 130 may change the meal schedule itself one hour later. In this case, the processor 130 may transmit a control signal for changing the scheduled setting time of a cooking device to the cooking device or the like.

However, the disclosure is not limited thereto, and when the delay time exceeds the reference time, the processor 130 may inquire of the user whether to change the meal schedule. Alternatively, the processor 130 may cancel the meal schedule. Alternatively, the processor 130 may store an operation history when the delay time exceeds the reference time, and determine whether to change the meal schedule based on the stored operation history.

Meanwhile, when the delay time is equal to or less than the reference time, the processor 130 may change a menu of the meal (S1050-N). In the example described above, if a delay time is 30 minutes or less, which is the reference time, the processor 130 may change the menu of the meal. For example, the processor 130 may change the menu of the meal to a convenience food, a low-calorie food, or the like. Alternatively, the processor 130 may check whether there is another schedule after the meal schedule, and may change the meal schedule or change the meal menu.

However, the disclosure is not limited thereto, and the processor 130 may change the meal schedule even when the delay time is equal to or less than the reference time. In this case, the processor 130 may not perform an operation of comparing the delay time with the reference time. Alternatively, the processor 130 may not perform any operation when the delay time is equal to or less than the reference time. For example, if the delay time is less than 10 minutes, the processor 130 may operate according to a predetermined meal schedule.

Figure 11:
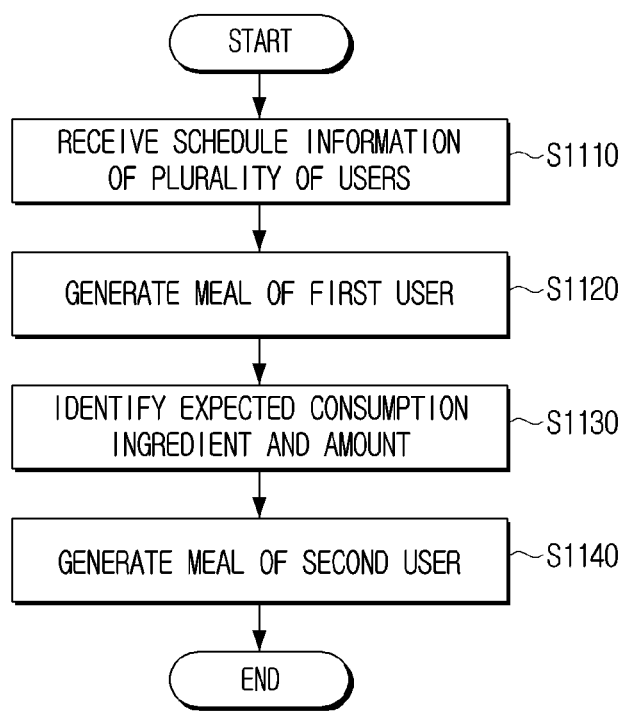
FIG. 11 is a flowchart illustrating an operation of a meal schedule for a plurality of users according to an embodiment of the disclosure.

FIG. 11 is a flowchart illustrating an operation of a meal schedule for a plurality of users according to an embodiment of the disclosure.

The processor 130 may receive schedule information of a plurality of users (S1110). The processor 130 may identify each user meal schedule based on schedule information of the plurality of users. For example, when schedule information of a first user and schedule information of a second user are received, the processor 130 may identify the first user meal schedule and the second user meal schedule.

When the first user meal schedule is earlier than the second user meal schedule, the processor 130 may generate the first user meal (S1120). The processor 130 may identify an expected amount of a consumed ingredient based on the first user meal (S1130). In this case, the processor 130 may recalculate an amount of a stored ingredient based on the identified expected amount of the consumed ingredient.

The processor 130 may generate the second user meal based on the recalculated amount of the stored ingredient (S1140). In addition, the processor 130 may identify the expected amount of the consumed ingredient based on the second user meal. In this case, the processor 130 may recalculate the amount of stored ingredient based on the identified expected amount of the consumed ingredient, and may reflect it in generating a subsequent meal. If it is identified that a specific ingredient is an insufficient ingredient after the recalculation, the processor 130 may proceed to purchase the corresponding insufficient ingredient.

However, the disclosure is not limited thereto, and the processor 130 may generate an integrated meal when meal times of the first user and the second user overlap. Here, the integrated meal may be a meal in which eating habits and health information of the first and second users are integrated and reflected.

Figure 12:
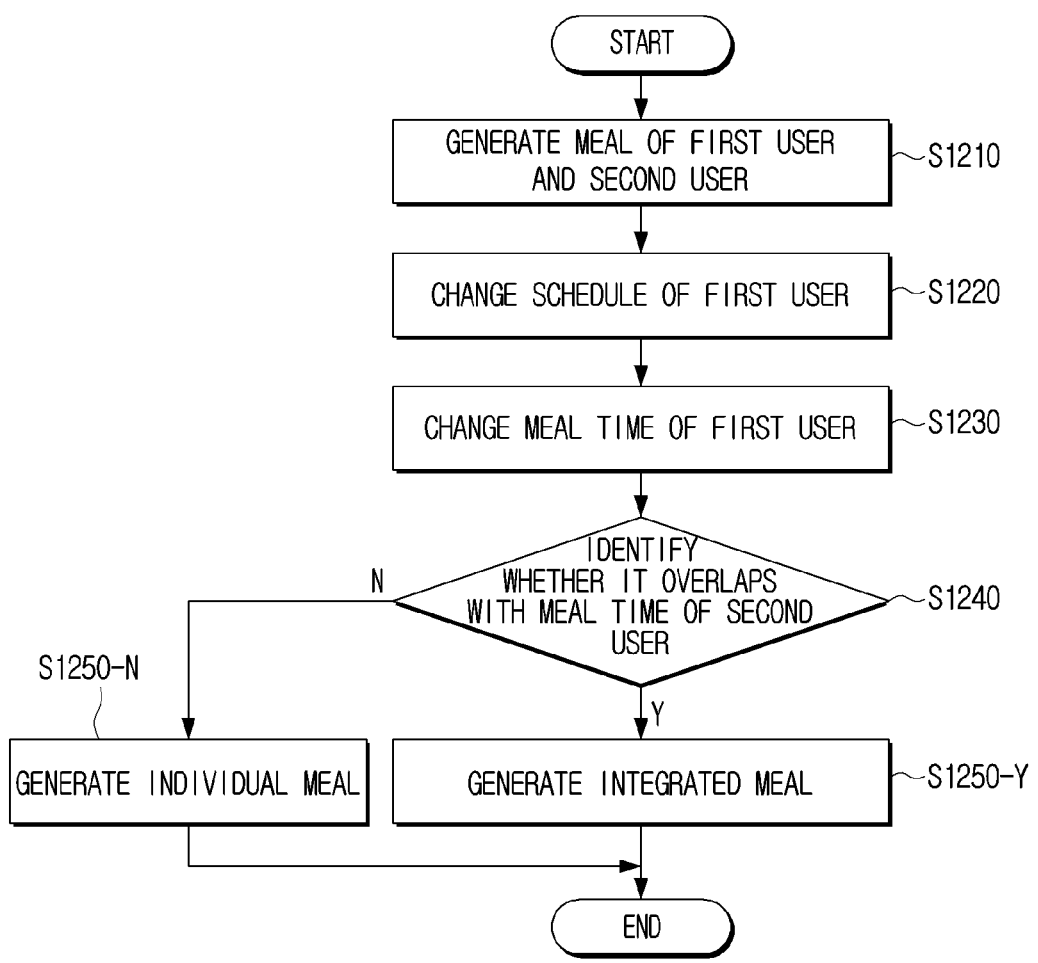
FIG. 12 is a flowchart illustrating an operation of a meal schedule according to a schedule change of one of a plurality of users according to an embodiment of the disclosure.

FIG. 12 is a flowchart illustrating an operation of a meal schedule according to a schedule change of one of a plurality of users according to an embodiment of the disclosure.

The processor 130 may generate meals for the first user and the second user (S1210). Here, when the first user schedule is changed (S1220), the processor 130 may change the first user meal time (S1230). For example, the processor 130 may change the meal time by an arrival time to a meal location based on the changed schedule of the first user.

The processor 130 may identify whether the changed meal time of the first user overlaps the meal time of the second user (S1240).

When the meal times of the two users overlap, the processor 130 may generate an integrated meal (S1250-Y). For example, when the meal times of two users overlap, the processor 130 may generate an integrated meal in such a way that some food is shared.

Alternatively, if the meal times of the two users do not overlap, the processor 130 may generate individual meals (S1250-N). In this case, the processor 130 may generate an individual meal by the method described with reference to FIG. 11.

Figure 13:
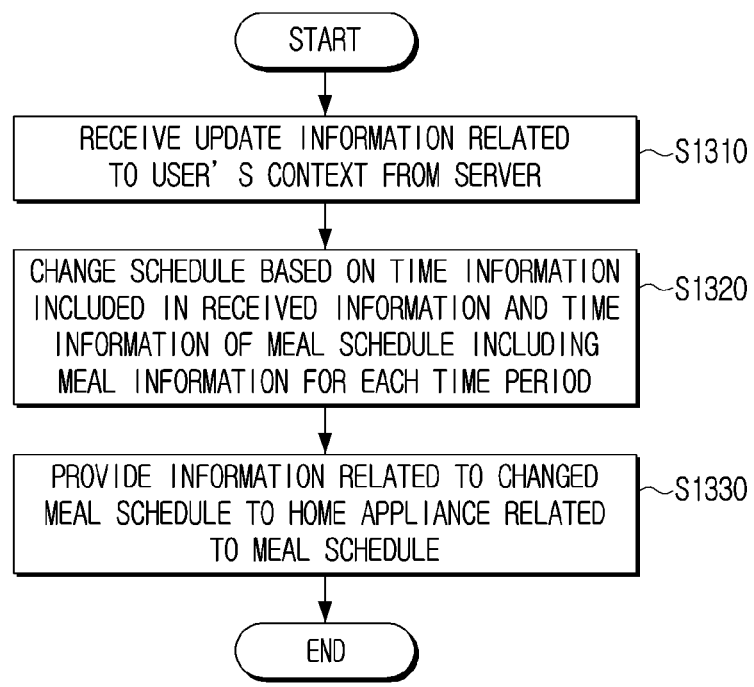
FIG. 13 is a flowchart illustrating a method of controlling an electronic apparatus according to an embodiment of the disclosure.

FIG. 13 is a flowchart illustrating a method of controlling an electronic apparatus according to an embodiment of the disclosure.

Update information related to the user context is received from the server (S1310). The meal schedule is changed based on time information included in the received information and time information of the meal schedule including meal information for each time period (S1320). Information related to the changed meal schedule is provided to a home appliance related to the meal schedule (S1330).

Here, the operation of changing (S1320) may identify, based on the time information included in the received information and the time information of the meal schedule, whether a meal according to the meal schedule is possible in a time period corresponding to the time information included in the received information, and may change the meal schedule if it is identified that the meal is impossible.

Also, the updated information related to the user context may include the updated user schedule information, and the operation of changing (S1320) may identify, based on the updated user schedule information and time information of the meal schedule, whether a meal according to the meal schedule is possible in a time period corresponding to the updated schedule information, and may change the meal schedule if it is identified that the meal is impossible.

Alternatively, the updated information related to the user context may include the updated user location information, and the operation of changing (S1320) may identify, based on the updated location information of the user, whether a meal according to the meal schedule is possible, and may change the meal schedule if it is determined that the meal is impossible.

Also, the operation of changing (S1320) may identify, based on the updated location information, whether the user can reach the meal location corresponding to the meal schedule in the time period included in the meal schedule, and may change the schedule when it is identified that the meal location is not reachable.

In addition, the operation of changing (S1320), when at least one of sensing information sensed at a meal location corresponding to the meal schedule or user payment history information is received, may identify the user location information based on the received information.

Meanwhile, the operation of changing (S1320) may include transmitting a request to change the meal schedule to the user terminal when it is identified that it is necessary to change the meal schedule based on the time information included in the received information and the time information of the meal schedule, and may include changing the meal schedule based on the received information when information corresponding to the change request is received from the terminal.

The operation of changing (S1320), when it is identified that the user meal is necessary based on the received information in a state that the meal information corresponding to the time information included in the received information is not included in the meal schedule, may transmit recommended meal information corresponding to the time information to the user terminal.

The method may further include transmitting a control signal for controlling an operation of the home appliance related to the meal schedule to the home appliance based on the changed meal schedule.

Meanwhile, the operation of changing (S1320), when a plurality of update information related to the user context are received, may identify at least one update information based on a priority of the plurality of update information, and change the meal schedule based on time information included in the identified update information and time information of the meal schedule.

According to various embodiments of the disclosure as described above, the electronic apparatus may improve user convenience by changing a meal schedule based on update information related to the user context and providing information related to the changed meal schedule.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Various exemplary embodiments described above may be embodied in a recording medium that may be read by a computer or a similar apparatus to the computer by using software, hardware, or a combination thereof. In a software configuration, various embodiments described in the specification such as a procedure and a function may be embodied as separate software modules. The software modules may respectively perform one or more functions and operations described in the present specification.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device. The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic apparatus comprising:
 a memory configured to store a meal schedule including meal information for one or more time periods;
 a communication interface comprising communication circuitry configured to communicate with a server and a home appliance related to the meal schedule; and
 a processor configured to:
  receive update information related to a user context from the server,
  in response to receiving update information related to the user context, change the meal schedule based on time information included in the received update information and time information of the meal schedule, and
  based on the changed meal schedule, control the communication interface to transmit a control signal to the home appliance, wherein the control signal causes the home appliance to perform a preheating operation or stop the preheating operation based on the control signal.

2. The apparatus of claim 1, wherein the processor is configured to:
 based on the received update information and the time information of the meal schedule, identify whether a meal according to the meal schedule is possible in a time period corresponding to the time information included in the received update information, and
 based on identifying the meal as impossible, change the meal schedule.

3. The apparatus of claim 1, wherein:
 the update information related to the user context includes updated schedule information of a user, and
 the processor is configured to:
  based on the updated schedule information of the user and the time information of the meal schedule, identify whether a meal according to the meal schedule is possible in a time period corresponding to the updated schedule information, and
  based on identifying the meal as impossible, change the meal schedule.

4. The apparatus of claim 1, wherein:
 the update information related to the user context includes updated location information of a user, and
 the processor is configured to:
  based on the updated location information of the user, identify whether a meal according to the meal schedule is possible, and
  based on identifying the meal as impossible, change the meal schedule.

5. The apparatus of claim 4, wherein the processor is configured to:
 based on the updated location information, identify whether the user is possible to reach a meal location corresponding to the meal schedule in a time period included in the meal schedule, and
 based on reaching the meal location identified as impossible, change the meal schedule.

6. The apparatus of claim 4, wherein the processor is configured to, based on receiving at least one of sensing information sensed at a meal location corresponding to the meal schedule or payment history information of the user, identify location information of the user based on the received update information.

7. The apparatus of claim 1, wherein the processor is configured to:
 based on identifying changing the meal schedule based on the time information included in the received update information and the time information of the meal schedule, control the communication interface to transmit a request for the change for the meal schedule to a user terminal, and
 based on receiving information corresponding to the request for the change from the user terminal, change the meal schedule based on the received update information.

8. The apparatus of claim 1, wherein the processor is configured to, based on identifying a meal of a user as necessary based on the received update information in a state that meal information corresponding to the time information included in the received update information is not included in the meal schedule, control the communication interface to transmit recommended meal information corresponding to the time information to a user terminal.

9. The apparatus of claim 1, wherein the processor is configured to, based on the changed meal schedule, control the communication interface to transmit a control signal for controlling an operation of the home appliance related to the meal schedule to the home appliance.

10. The apparatus of claim 1, wherein the processor is configured to:
  based on receiving a plurality of update information related to the user context through the communication interface, identify at least one update information based on a priority for each of the plurality of update information, and
  change the meal schedule based on time information included in the identified at least one update information and the time information of the meal schedule.

11. The apparatus of claim 1, wherein:
  the memory is further configured to:
    store a first meal schedule including meal information for each first time period of a first user, and
    store a second meal schedule including meal information for each second time period of a second user,
  the processor is configured to:
    based on changing the first meal schedule, identify an expected amount of a consumed ingredient based on the changed first meal schedule, and
    change the second meal schedule based on the identified expected amount of the consumed ingredient.

12. The apparatus of claim 11, wherein:
  the memory further stores information on a stored ingredient, and
  the processor is configured to:
    update information on the stored ingredient based on the identified expected amount of the consumed ingredient, and
    change the second meal schedule based on the update information on the stored ingredient.

13. The apparatus of claim 12, wherein the processor is configured to:
  identify an insufficient ingredient required to be purchased based on the update information on the stored ingredient, and
  control the communication interface to transmit information on the insufficient ingredient required to be purchased to a user terminal.

14. The apparatus of claim 11, wherein the processor is configured to, based on receiving the update information related to the user context from the server through the communication interface, change first time information based on the time information included in the received update information and first time information of the first meal schedule.

15. A control method of an electronic apparatus comprising:
  receiving update information related to a user context from a server;
  in response to receiving the update information, changing a meal schedule based on time information included in the received update information and time information of the meal schedule including meal information for each time period; and
  based on the changed meal schedule, transmitting a control signal to a home appliance, wherein the control signal causes the home appliance to perform a preheating operation or stop the preheating operation based on the control signal.

16. The method of claim 15, further comprising:
  based on the received update information and the time information of the meal schedule, identifying whether a meal according to the meal schedule is possible in a time period corresponding to the time information included in the received update information, and
  based on identifying the meal as impossible, changing the meal schedule.

17. The method of claim 15, wherein:
  the update information related to the user context includes updated schedule information of a user, and
  the method further comprising:
    based on the updated schedule information of the user and the time information of the meal schedule, identifying whether a meal according to the meal schedule is possible in a time period corresponding to the updated schedule information, and
    based on identifying the meal as impossible, changing the meal schedule.

18. The method of claim 15, wherein:
  the update information related to the user context includes updated location information of a user, and
  the method further comprising:
    based on the updated location information of the user, identifying whether a meal according to the meal schedule is possible, and
    based on identifying the meal as impossible, changing the meal schedule.

19. The method of claim 18, further comprising:
  based on the updated location information, identifying whether the user is possible to reach a meal location corresponding to the meal schedule in a time period included in the meal schedule, and
  based on reaching the meal location identified as impossible, changing the meal schedule.

20. The method of claim 18, further comprising:
  based on receiving at least one of sensing information sensed at a meal location corresponding to the meal schedule or payment history information of the user, identifying location information of the user based on the received update information.

* * * * *